Dec. 15, 1970

L. R. FALCE 3,548,345

BRAZED DIELECTRIC-TO-METAL JOINTS FOR SLOW-WAVE
STRUCTURE ASSEMBLIES

Original Filed Sept. 15, 1966

INVENTOR.
LOUIS R. FALCE,

Paul M. Cole

ATTORNEY

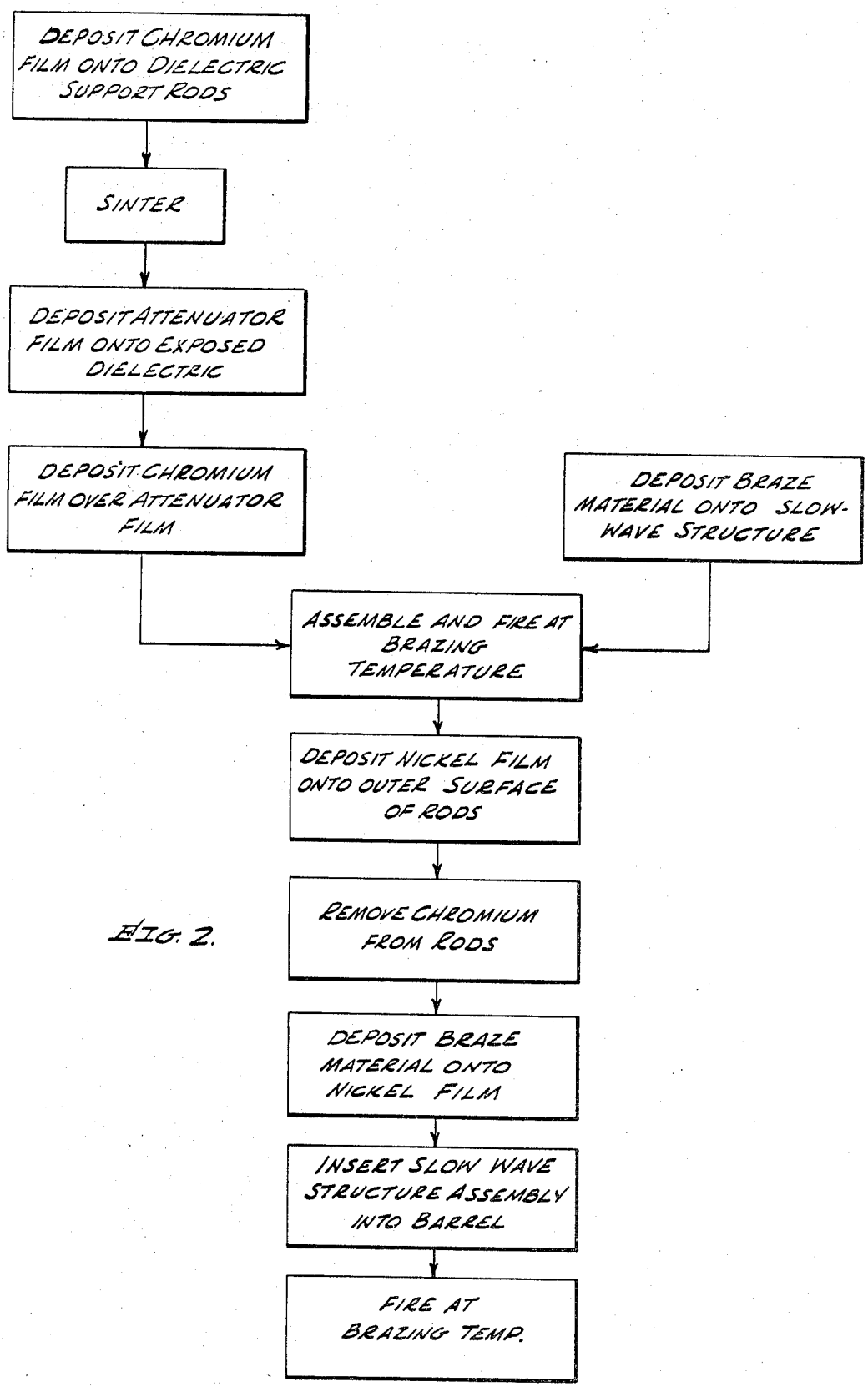

Dec. 15, 1970     L. R. FALCE     3,548,345
BRAZED DIELECTRIC-TO-METAL JOINTS FOR SLOW-WAVE
STRUCTURE ASSEMBLIES
Original Filed Sept. 15, 1966     3 Sheets-Sheet 3

United States Patent Office 3,548,345
Patented Dec. 15, 1970

3,548,345
BRAZED DIELECTRIC-TO-METAL JOINTS FOR
SLOW-WAVE STRUCTURE ASSEMBLIES
Louis R. Falce, Santa Monica, Calif., assignor to Hughes
Aircraft Company, Culver City, Calif., a corporation
of Delaware
Original application Sept. 15, 1966, Ser. No. 579,648.
Divided and this application Apr. 15, 1969, Ser. No.
830,172
Int. Cl. H03h 7/30
U.S. Cl. 333—31                                    6 Claims

ABSTRACT OF THE DISCLOSURE

A slow-wave structure supporting and encasing assembly is disclosed which includes a slow-wave structure and a plurality of dielectric rods disposed about the slow-wave structure periphery. A layer of elemental chromium bonded directly to a surface of each of the rods facing the slow-wave structure is brazed to the slow-wave structure. Another layer of elemental chromium is bonded directly between a surface of each of the rods facing away from the slow-wave structure and a layer of nickel. A tubular encasing member of a material having a thermal coefficient of expansion substantially matching that of the rod material is coaxially disposed about the slow-wave structure and the rods and is brazed to the nickel layer.

---

This is a division of application Ser. No. 579,648, filed Sept. 15, 1966, now abandoned.

This invention relates to dielectric-to-metal joints and has particular application to supporting and encasing assemblies for slow-wave structures of the type used in traveling-wave tubes.

In electron beam tubes of the traveling-wave type, a stream of electrons is caused to interact with a propagating electromagnetic wave in a manner which amplifies the electromagnetic wave energy. In order to achieve the desired interaction, the electromagnetic wave is propagated along a slow-wave structure, such as an electrically conductive helix wound about the path of the electron stream. The slow-wave structure provides a path of propagation for the electromagnetic wave which is considerably longer than the axial length of the structure so that the traveling-wave may be made to effectively propagate at nearly the velocity of the electron stream. Slow-wave structures of the helix type are usually supported within a vacuum envelope by means of a plurality of equally circumferentially spaced dielectric rods disposed between the slow-wave structure and the envelope.

A method which has been used to attach a slow-wave structure to its dielectric support rods involves painting or spraying a dispersion of molybdenum metal powder and powered oxides of manganese, titanium, and silicon onto the support rods, sintering the rods at a temperature above 1350° C. in wet hydrogen and brazing the metallized and sintered rods to the slow-wave structure with a brazing alloy in sheet or wire form. Although dielectric-to-metal joints of good mechanical strength can be made by this method, the radio frequency energy dissipation in such joints is excessively high for certain applications, and at the same time the thermal conductivity of these joints is not optimum.

A method commonly employed to mount a slow-wave structure and its support rods within the encasing envelope involves making the envelope in the form of a resilient tubular metallic clamp. The cross section of the clamp is initially circular, with a cross-sectional area greater than that of the structure-rod assembly to be inserted within the clamp, but with a normal diameter which is less than that of the circle circumscribing the structure-rod assembly. The clamp is first distorted by forces applied at a number of points corresponding to the number of rods so as to produce a geometric configuration more nearly identical to that of the structure-rod assembly. The structure-rod assembly is then inserted into the distorted clamp with the rods intermediate the points of application of the forces. Upon removal of the distorting forces, the clamp restores itself to nearly its original circular shape, and in doing so compresses the rods and the slow-wave structure into a rigid assembly. Since, with slow-wave structure encasements made according to the foregoing technique, the envelope and the dielectric support rods are merely in abutting contact with one another rather than being bonded or fused together, relatively poor heat transfer properties are provided between the rods and the envelope, and also excessive radio frequency loss occurs at the rod-envelope contact regions.

Accordingly, it is an object of the present invention to provide a slow-wave structure dielectric-to-metal joint having low radio frequency loss properties.

It is a further object of the present invention to provide a slow-wave structure dielectric-to-metal bond having a high thermal conductivity.

It is a still further object of the present invention to provide a slow-wave structure supporting and encasing assembly in which the bonds between the slow-wave structure and its support rods and between the support rods and the encasing member both possess outstanding thermal and electric properties.

It is still another object of the present invention to provide a slow-wave structure supporting, encasing, and attenuating assembly which is capable of handling greater amounts of power than similarly dimensioned assemblies of the prior art.

A slow-wave structure supporting and encasing assembly according to the invention includes a slow-wave structure and a plurality of dielectric rods disposed about the peripheral surface of the slow-wave structure and extending parallel to the axis of the slow-wave structure. A first layer of elemental chromium is bonded directly to a surface of each of the rods facing the slow-wave structure. First braze material is disposed between the slow-wave structure and each first chromium layer and is bonded directly to the slow-wave structure and to each first chromium layer. A second layer of elemental chromium is bonded directly to a surface of each of the rods facing away from the slow-wave structure, while a layer of nickel is disposed over and is bonded directly to each second chromium layer. A tubular encasing member of a material having a thermal coefficient of expansion substantially the same as the material of the rods is coaxially disposed about the slow-wave structure and the rods. Second braze material is disposed between the inner surface of the encasing member and each nickel layer and is bonded directly to the encasing member and to each nickel layer.

If it is desired to introduce electrical attenuation into the assembly, a film of attenuating material may be deposited onto exposed regions of the support rods subsequent to a sintering operation which follows the chromium deposition. After the deposition of the attenuating film, another film of elemental chromium may be deposited over the attenuating film.

Additional objects, advantages, and characteristic features of the present invention will become readily apparent from the following detailed description of preferred embodiments of the invention when considered in conjunction with the accompanying drawings in which:

FIG. 2 is a block diagram illustrating respective steps in fabricating a slow-wave structure supporting, encasing, and attenuating assembly in accordance with a preferred embodiment of the invention;

Figure 9:
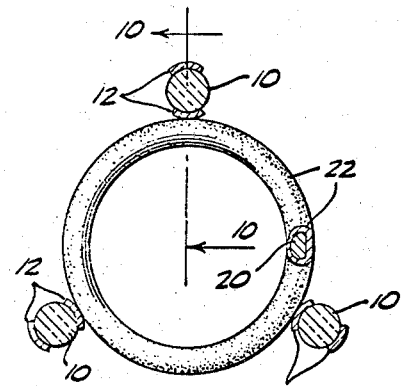
FIG. 9 is a cross-sectional view of a slow-wave structure and its support rods in assembled relation during subsequent processing in accordance with the method illustrated in FIG. 2.
Figure 10:
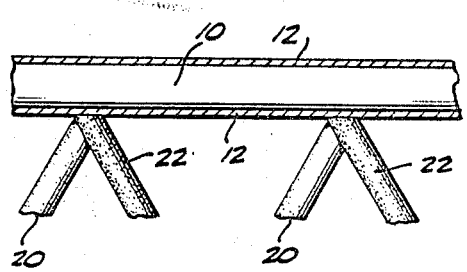
FIG. 10 is a longitudinal sectional view taken along line 10—10 of FIG. 9.
Figure 11:
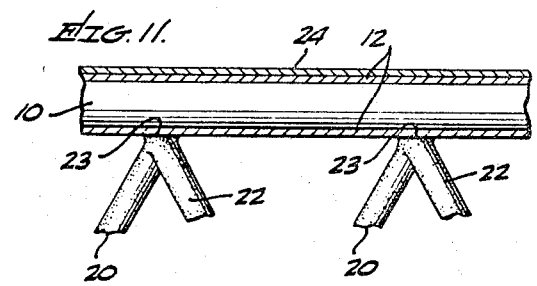
Figure 12:
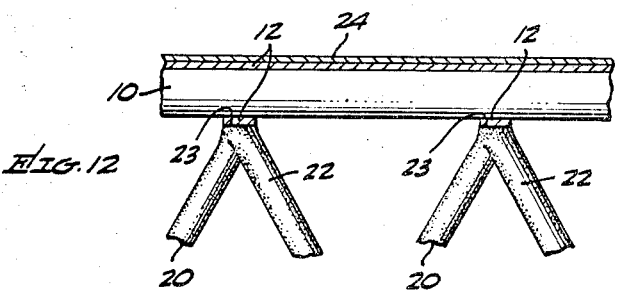
Figure 13:
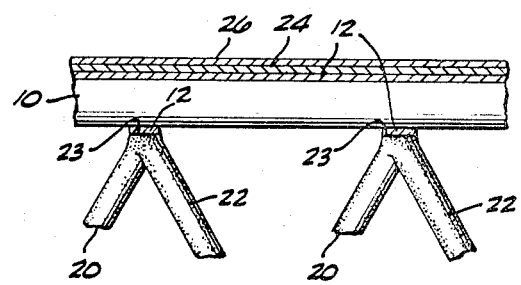
Figure 14:
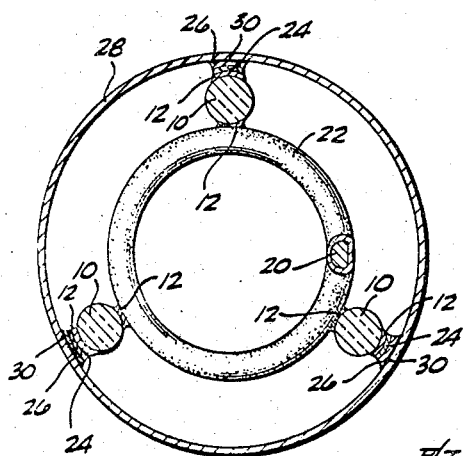

FIGS. 11, 12, and 13 are longitudinal views illustrating the assembly of FIG. 10 at subsequent successive stages in its processing in accordance with the method shown in FIG. 2; and FIG. 14 is a cross-sectional view similar to FIG. 9 illustrating a slow-wave structure and its support rods secured within an encasing barrel at the final stage of processing in accordance with the method shown in FIG. 2.

Figure 1:
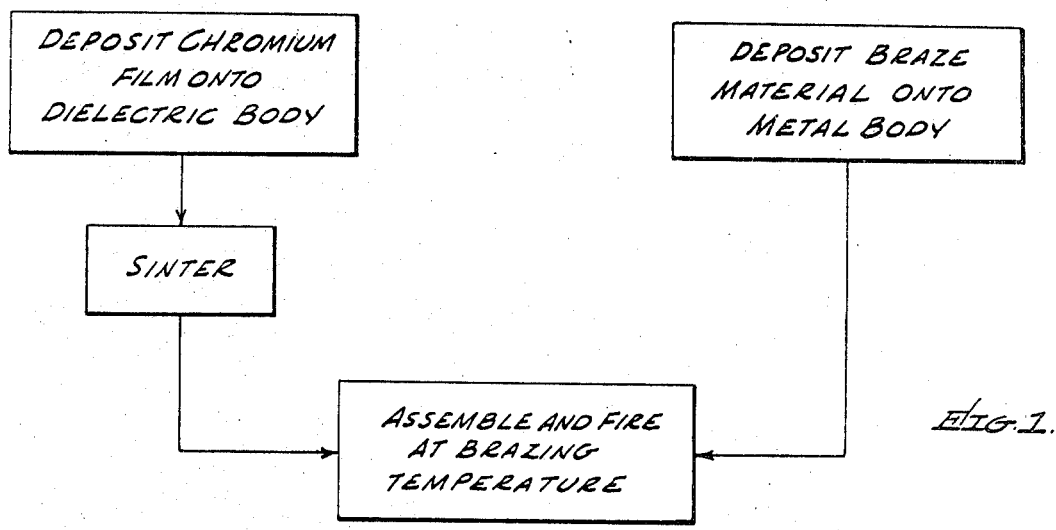
FIG. 1 is a block diagram illustrating respective steps in making dielectric-to-metal joints according to the invention.

As is illustrated in FIG. 1, the first step in making a dielectric-to-metal joint in accordance with the invention involves vapor depositing a film of elemental chromium onto the dielectric body to be joined. By elemental chromium it is meant chromium as a chemical element in contrast to being alloyed or combined with another substance. Examples of a few illustrative dielectric materials which may be used are alumina, beryllia, quartz, glass, and sapphire, it being understood that many other dielectric materials are also suitable. The particular material selected for a given application is the one whose dielectric properties are best suited to the desired application. The chromium film may, for example, be deposited onto the dielectric body by a technique called "ion plating," and which technique is described in detail in an article by D. M. Mattox entitled "Film Deposition Using Accelerated Ions," Electrochemical Technology, vol. 2, No. 9–10, September-October 1964, pp. 295–298. The chromium film preferably is deposited to a thickness essentially between .0001 inch and .001 inch.

The chromium-coated dielectric body may then be sintered by firing it in a dry hydrogen atmosphere at a temperature in a range extending essentially from 1325° C. to 1350° C. By a dry atmosphere it is meant an atmosphere having a dew point lower than —60° C., the dew point being the temperature at which condensation of water vapor in the atmosphere in question occurs. It is pointed out that the sintering step is not essential for making a dielectric-to-metal joint in accordance with the present invention; however, the sintering operation does increase the tensile strength of the resultant joint.

Prior to brazing the chromium-coated dielectric body to a metal body, the metal body to be joined is coated with braze material such as copper or a copper-gold or copper-silver alloy. The braze material may be deposited onto the metal body by means of the aforementioned technique of ion plating. The braze material should have a melting point lower than that of either of the materials to be joined. For example, when joining the dielectric beryllia (melting point approximately 2530° C.) to the metal molybdenum (melting point approximately 2620° C.), copper (which has a melting point of 1083° C.) may be employed as the braze material.

The chromium-coated dielectric body and the braze material-coated metal body are then assembled together in the desired contacting relationship and fired in a dry hydrogen atmosphere at a temperature slightly higher than the melting point of the braze material but lower than the melting points of the materials to be joined in order to melt the braze material and bond the dielectric and metal bodies together. For the aforementioned exemplary materials (beryllia, molybdenum, and copper) appropriate brazing temperatures would be in a range extending essentially from 1090° C. to 1100° C.

In accordance with a preferred embodiment of the present invention, the aforedescribed method may be employed to fabricate an assembly consisting of a slow-wave structure and its support rods mounted in an encasing barrel. Respective steps in the method are illustrated in the block diagram of FIG. 2, while the resultant structure at various stages of its fabrication is illustrated in FIGS. 3–14.

Figure 3:
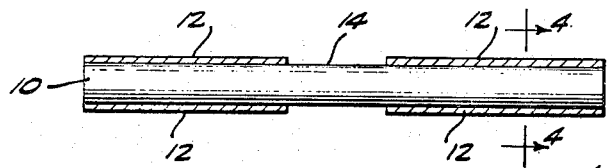
FIG. 3 is a longitudinal view showing a slow-wave structure support rod after initial processing according to the method illustrated in FIG. 2.
Figure 4:
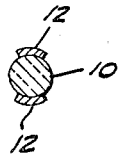
FIG. 4 is a cross-sectional view taken along line 4—4 of FIG. 3.

As is shown in FIGS. 3 and 4, portions of the circumferential surface a slow-wave structure support rod 10, which may be of a dielectric material such as beryllia, are first coated with a layer 12 of elemental chromium. The chromium layer 12, which may be vapor deposited onto the rod 10 by means of the aforementioned technique of ion plating, preferably has a thickness in the range essentially between .0001 inch and .001 inch. As may be seen, the chromium film 12 is located along longitudinally extending strips on diametrically opposite portions of the circumferential surface of the rod 10, while a cylindrical portion 14 of the surface of the rod 10 which is located approximately midway along the length of the rod remains exposed, i.e. is not covered with chromium.

The chromium-coated dielectric rod 10 may then be sintered by firing the rod in a dry hydrogen atmosphere at a temperature in a range extending essentially from 1325° C. to 1350° C. Again, it is pointed out that the sintering operation may be omitted, although sintering is highly desirable from the standpoint of increasing the tensile strength of the resultant joint.

Figure 5:
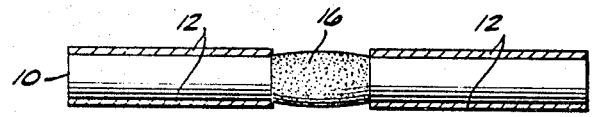
FIGS. 5 and 6 are longitudinal views illustrating the rod of FIG. 3 at subsequent successive stages in its processing according to the method shown in FIG. 2.

As is shown in FIG. 5, a film 16 of attenuating material such as titanium carbide may then be deposited onto the exposed surface 14 of the rod 10, by means of cathodic sputtering for example, in order to introduce attenuation to the slow-wave structure assembly. The attenuating film 16 preferably has a tapered configuration with a thickness at its central region substantially greater than at its end regions in order to minimize reflections of electromagnetic waves as they travel axially along the rods 10 during operation of the device into which the rods are to be incorporated. A typical exemplary thickness for the attenuating film 16 is about 1 A. at the ends and about 1 micron at the center. It is pointed out that although other attenuating materials such as pyrolytically deposited carbon or graphite may be employed, titanium carbide is preferred because of its better thermal stability and its more constant resistivity as a function of temperature.

Figure 6:
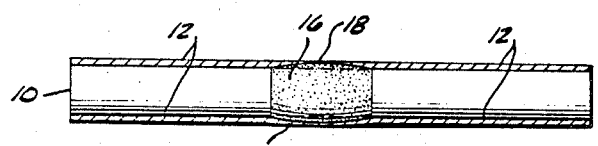

Next, the chromium deposition operation is repeated in order to deposit strips 18 of elemental chromium onto diametrically opposite surfaces of the attenuating film 16 which are aligned with the rod surfaces provided with the chromium strips 12 (see FIG. 6). The remainder of the structure is masked during this chromium deposition to prevent the redeposition of chromium onto previous chromium deposits and thereby allow the thickness of the chromium strips 18 to essentially equal that of the strips 12. It is pointed out that two separate chromium deposition operations are necessary only if a chromium sintering operation is included in the over-all process, because if the sintering were performed subsequent to deposition of the titanium carbide, diffusion of titanium carbide into the dielectric rod would occur during sintering and thereby alter the resistive properties of the titanium carbide film. Therefore, it is preferred to first deposit most of the chromium, then sinter, then deposit the titanium carbide, and then deposit chromium over the titanium carbide. This ensures that the chromium, except for the relatively small portion covering the titanium carbide, can be sintered without adversely affecting the attenuation properties of the titanium carbide film.

It is also pointed out that for resultant devices having power levels sufficiently low so that attenuation is not needed, the steps of depositing the attenuator film 16 and the second chromium films 18 may be omitted. In this event it would not be necessary to provide the exposed rod surface 14 during the initial chromium deposition, but rather the chromium strips 12 could extend along the entire length of the rod 10.

Figure 7:
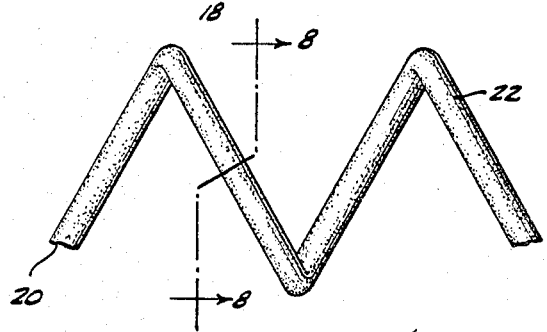
FIG. 7 is a longitudinal view showing a slow-wave structure helix after initial processing in accordance with the method illustrated in FIG. 2.
Figure 8:
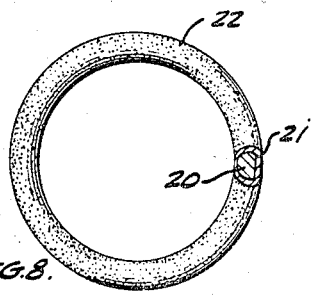
FIG. 8 is a cross-sectional view taken along line 8—8 of FIG. 7.

As is shown in FIGS. 7 and 8, a slow-wave structure 20 to which the support rods 10 are to be attached is prepared by flattening its outer peripheral surface 21 and depositing a film 22 of braze material onto the flattened peripheral surface, although some braze material will also deposit onto the remaining surfaces of the slow-wave structure 20. It is pointed out that although the slow-wave structure 20 is illustrated as having a helical configuration, other types of slow-wave structures such as a ring-bar or a cloverleaf structure are also suitable. The braze material 22 may be any of the materials set forth above with respect to making a dielectric-to-metal joint by the method of FIG. 1 and may be deposited onto the slow-wave structure 20 by means of the aforementioned technique of ion plating. As a specific example, the slow-wave structure 20 may be of molybdenum, and the braze material 22 may be copper.

A plurality of the chromium-coated support rods 10 are then assembled about the outer peripheral surface of the slow-wave structure 20 in a manner such as is illustrated in FIG. 9 with the chromium strips 12 contacting the braze material 22. It is pointed out that in theory any number of rods 10 may be used to support the slow-wave structure 20 depending on particular design criteria, three such support rods being shown in FIG. 9 by way of example. The assembly is then fired in a dry hydrogen atmosphere at a temperature slightly higher than the melting point of the braze material 22 but lower than the melting points of respective materials of the slow-wave structure 20 and the rods 10 in order to melt the braze material 22 and form a brazed joint 23 (FIG. 11) between the rods 10 and the slow-wave structure 20. When copper is used as the braze material to join beryllia rods to a molybdenum slow-wave structure, appropriate brazing temperatures would be in a range extending essentially from 1090° C. to 1100° C.

After the slow-wave structure 20 has been brazed to the support rods 10, it is necessary to remove the chromium from the inwardly facing surfaces of the rods 10 which do not contact the slow-wave structure 20 in order to eliminate a short-circuiting path along the rods 10 between successive turns of the slow-wave structure 20. However, the chromium on the outwardly facing surfaces of the rods 10 should not be removed at this time because these surfaces subsequently must be brazed to an encasing barrel. Therefore, as is shown in FIG. 11, a film 24 of nickel is deposited, by means of the aforementioned technique of ion plating for example, over the chromium strips 12 on the outwardly facing surfaces of the rods 10. The chromium located between the brazed joints 23 on the inner surfaces of the rods 10 is then removed by immersing the assembly in concentrated hydrochloric acid at a temperature of around 50° C. for about two minutes, with the nickel film 24 protecting the chromium on the outer surfaces of the rods 10 from attack by the hydrochloric acid. The resultant structure after the selective chromium removal operation is illustrated in FIG. 12.

The assembly is then prepared for brazing to an encasing barrel which is preferably of a material having a thermal coefficient of expansion substantially the same as that of the material of the support rods 10. For example, for beryllia support rods the encasing barrel may be of niobium or a combination of materials such as molybdenum and copper alternately disposed along the length of the barrel in the desired relative extent to produce a net thermal coefficient expansion essentially the same as that of beryllia. As is shown in FIG. 13, prior to insertion of the assembly into the encasing barrel, a film 26 of braze material having a melting point lower than the melting point of the braze material used to bond the rods 10 to the slow-wave structure 20 is deposited onto the nickel film 24. This deposition may be carried out by means of the aforementioned technique of ion plating. An example of a particular braze material which may be used as the material 26 when joining a combined molybdenum and copper barrel to beryllia support rods is a copper-silver alloy consisting of essentially 28% copper and 72% silver.

The slow-wave structure 20 and its attached support rods 10 are then inserted into an encasing barrel 28 in a manner such as illustrated in FIG. 14, and the resultant assembly is fired in a dry hydrogen atmosphere at a temperature slightly higher than the melting point of the braze material 26 but lower than the melting points of the respective materials of the barrel 28 and the rods 10 and of the braze material 22 employed in the previous braze operation. For the aforementioned exemplary copper-silver alloy as the material 26, appropriate brazing temperatures would be in a range extending essentially from 840° C. to 850° C. Brazed joints 30 are thus formed between the barrel 28 and the respective rods 10 which bond the rods and the barrel together and thereby complete the slow-wave structure supporting and encasing assembly.

It should be apparent that while the present invention is particularly suited to bonding a slow-wave structure to its support rods and, in turn, bonding the support rods to an encasing barrel, the invention is generally applicable to the fabrication of dielectric-to-metal joints which have high thermal conductivity and low radio frequency loss properties. When specifically employed to fabricate slow-wave structure supporting, encasing, and attenuating assemblies, the resultant assemblies are capable of handling greater amounts of power than similarly dimensioned assemblies of the prior art.

Thus, although the invention has been shown and described with respect to specific methods and devices, nevertheless, various changes and modifications obvious to a person skilled in the art to which the invention pertains are deemed to lie within the purview of the invention.

What is claimed is:

1. A slow-wave structure supporting assembly comprising: a slow-wave structure, a plurality of dielectric rods disposed about the peripheral surface of said slow-wave structure and extending parallel to the axis of said slow-wave structure, a layer of elemental chromium bonded directly to a surface of each of said rods facing said slow-wave structure, and braze material disposed between said slow-wave structure and each said chromium layer and bonded directly to said slow-wave structure and to each said chromium layer.

2. A slow-wave structure supporting assembly according to claim 1 wherein said slow-wave structure is of molybdenum, said dielectric rods are of beryllia, and said braze material is copper.

3. A slow-wave structure supporting and attenuating assembly comprising: a slow-wave structure, a plurality of dielectric rods disposed about the peripheral surface of said slow-wave structure and extending parallel to the axis of said slow-wave structure, a layer of attenuating material disposed over an annular portion of the surface of each of said rods, a layer of elemental chromium having a portion bonded directly to a surface of each of said rods facing said slow-wave structure and having another portion extending over and bonded directly to a portion of each said attenuating layer facing said slow-wave structure, and braze material disposed between said slow-wave structure and each said chromium layer and bonded directly to said slow-wave structure and to each said chromium layer.

4. A slow-wave structure supporting and encasing assembly comprising: a slow-wave structure, a plurality of dielectric rods disposed about the peripheral surface of said slow-wave structure and extending parallel to the axis of said slow-wave structure, a first layer of elemental chromium bonded directly to a surface of each of said rods facing said slow-wave structure, first braze material disposed between said slow-wave structure and each said first chromium layer and bonded directly to said slow-wave structure and to each said first chromium layer, a second layer of elemental chromium bonded directly to a surface of each of said rods facing away from said slow-wave structure, a layer of nickel disposed over and bonded directly to each said second chromium layer, a tubular encasing member coaxially disposed about said slow-wave structure and said rods, said encasing member being of a material having a thermal coefficient of expansion substantially the same as that of the material of said rods, and second braze material disposed between the inner surface of said encasing member and each said nickel layer and bonded directly to said encasing member and to each said nickel layer.

5. A slow-wave structure supporting and encasing assembly according to claim 4 wherein said slow-wave structure is of molybdenum, said dielectric rods are of beryllia, said first braze material is copper, and said second braze material is an alloy of copper and a silver.

6. A slow-wave structure supporting, encasing and attenuating assembly comprising: a slow-wave structure, a plurality of dielectric rods disposed about the peripheral surface of said slow-wave structure and extending parallel to the axis of said slow-wave structure, a layer of attenuating material disposed over an annular portion of the surface of each of said rods, a first layer of elemental chromium having a portion bonded directly to a surface of each of said rods facing said slow-wave structure and having another portion extending over and bonded directly to a portion of each said attenuating layer facing said slow-wave structure, first braze material disposed between said slow-wave structure and each said first chromium layer and bonded directly to said slow-wave structure and to each said first chromium layer, a second layer of elemental chromium having a portion bonded directly to a surface of each of said rods facing away from said slow-wave structure and having another portion extending over and bonded directly to a portion of each said attenuating layer facing away from said slow-wave structure, a layer of nickel disposed over and bonded directly to each said second chromium layer, a tubular encasing member coaxially disposed about said slow-wave structure and said rods, said encasing member being of a material having a thermal coefficient of expansion substantially the same as that of the material of said rods, and second braze material disposed between the inner surface of said encasing member and each said nickel layer and bonded directly to said encasing member and to each said nickel layer.

References Cited

UNITED STATES PATENTS

| | | | |
|---|---|---|---|
| 2,790,926 | 4/1957 | Morton | 315—3.5 |
| 2,812,499 | 11/1957 | Robertson | 315—3.5X |
| 3,276,107 | 10/1966 | Wallace | 315—3.5X |
| 3,300,677 | 1/1967 | Karol et al. | 315—3.5 |
| 3,421,040 | 1/1969 | Winslow | 315—3.5 |
| 3,435,273 | 3/1969 | Kennedy | 315—3.5X |
| 2,163,408 | 6/1939 | Pulfrich | 289—189.365 |
| 2,163,409 | 6/1939 | Pulfrich | 289—189.365 |
| 2,446,277 | 8/1948 | Gordon | 287—189.365 |
| 2,857,663 | 10/1958 | Beggs | 287—189.365 |

ELI LIEBERMAN, Primary Examiner

S. CHATMON, Jr., Assistant Examiner

U.S. Cl. X.R.

287—189.365; 29—472.7, 600; 315—3.5